United States Patent [19]

Lighthart et al.

[11] Patent Number: 4,845,609
[45] Date of Patent: Jul. 4, 1989

[54] COMPUTER COMMUNICATIONS SUBSYSTEM USING AN EMBEDDED TOKEN-PASSING NETWORK

[75] Inventors: Eric L. Lighthart, San Diego; Robert A. Hahn, Poway; Jean M. Lindstrom; Jon R. Rummell, both of San Diego, all of Calif.

[73] Assignee: Systech Corporation, San Diego, Calif.

[21] Appl. No.: 890,763

[22] Filed: Jul. 25, 1986

[51] Int. Cl.⁴ .................... G06F 13/00; G06F 13/12; H04J 3/14; H04J 3/24
[52] U.S. Cl. .................................... 364/200; 370/85; 370/89; 340/825.08
[58] Field of Search ... 364/200 MS File, 900 MS File; 370/89; 340/825.08

[56] References Cited

U.S. PATENT DOCUMENTS

| | | | |
|---|---|---|---|
| 4,156,798 | 5/1979 | Doelz | 364/200 |
| 4,162,520 | 7/1979 | Cook et al. | 364/200 |
| 4,170,038 | 10/1979 | Bouvier et al. | 364/200 |
| 4,246,637 | 1/1981 | Brown et al. | 364/200 |
| 4,413,319 | 11/1983 | Schultz et al. | 364/200 |
| 4,443,850 | 4/1984 | Harris | 364/200 |
| 4,455,621 | 6/1984 | Pelley et al. | 364/900 |
| 4,484,263 | 11/1984 | Olson et al. | 364/200 |
| 4,502,137 | 2/1985 | Tan | 370/85 |
| 4,590,468 | 5/1986 | Stieglitz | 340/825.5 |
| 4,637,013 | 1/1987 | Nakamura | 370/85 |
| 4,667,193 | 5/1987 | Cotie et al. | 340/825.08 |
| 4,689,786 | 8/1987 | Sidhu et al. | 370/94 |
| 4,707,830 | 11/1987 | Ulug | 370/89 |
| 4,725,834 | 2/1988 | Chang et al. | 340/825.05 |
| 4,727,538 | 2/1988 | Furchtgott et al. | 370/85 |

Primary Examiner—Archie E. Williams, Jr.
Assistant Examiner—Danh Phung
Attorney, Agent, or Firm—Knobbe, Martens, Olson & Bear

[57] ABSTRACT

A high performance terminal input/output subsystem for connecting a multiplicity of user devices to a multi-user computer includes a single-board host adapter which is mounted in a single bus slot in the host computer card cage and provides the communication between the subsystem and the host computer. One or more multiple terminal, intelligent cluster controllers is remotely located from and coupled to the host adapter by means of a coaxial cable. The cluster controllers are multidropped from the coaxial cable in daisy chain fashion. Communication between the host adapter and cluster controllers utilizes a high speed communication line employing a 2.5 Mbit/second baseband, token-passing, serial bus, local area network protocol. Each cluster controller provides local terminal connections for 8 or 16 user devices.

47 Claims, 6 Drawing Sheets

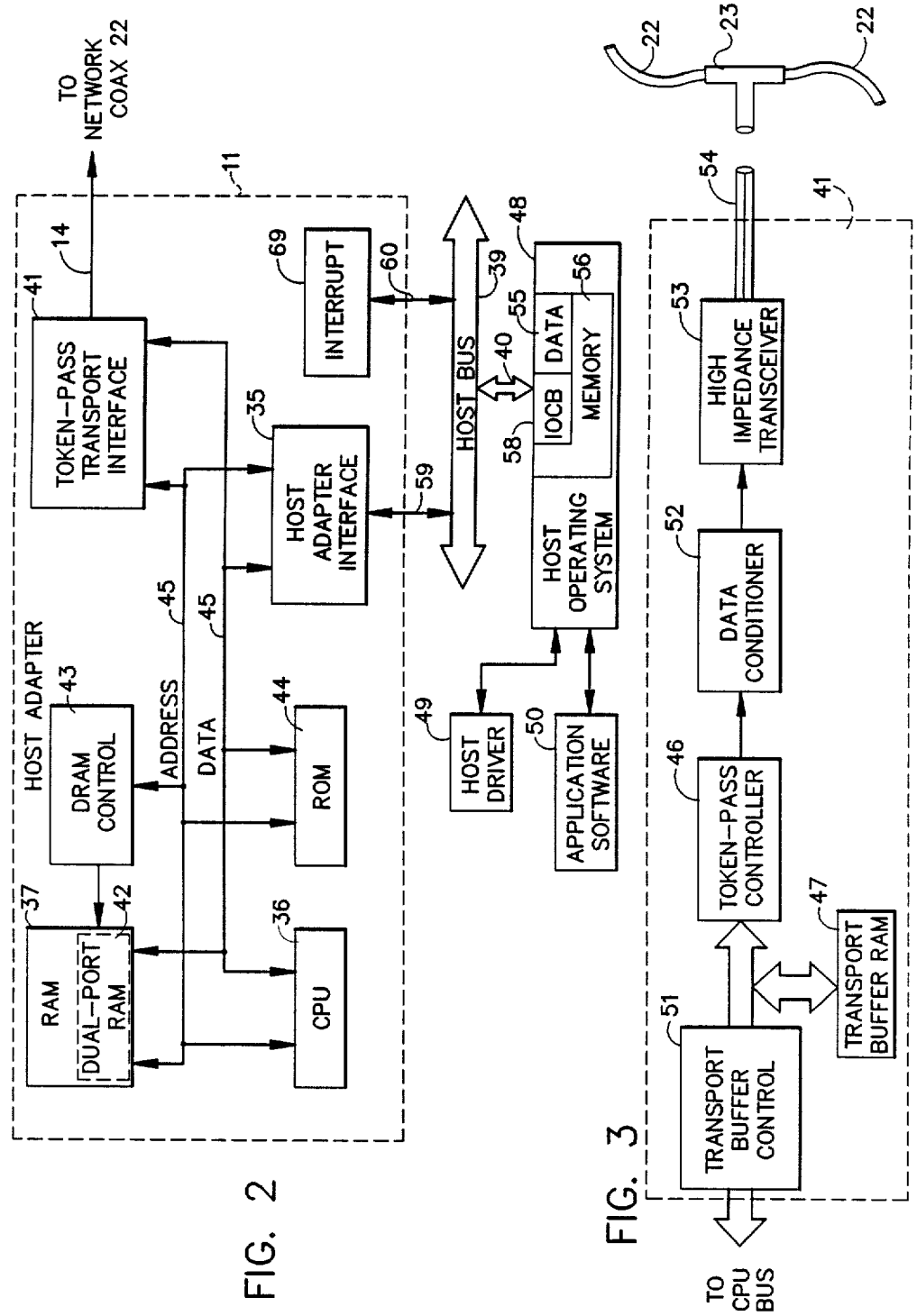

COMPUTER COMMUNICATIONS SUBSYSTEM USING AN EMBEDDED TOKEN-PASSING NETWORK

FIELD OF THE INVENTION

This invention relates generally to interconnection between computers and user devices, and is more specifically directed to a token-passing, local area network, serial bus system for connecting multiple user devices to an interactive computer system.

DISCUSSION OF THE PRIOR ART

End user computer and terminal requirements have tended to grow at a rate substantially faster than have the companies that employ such computer systems and devices. It is also true that the need for improved data communications within a company employing computers tends to expand at an even greater rate than do the computer and user device requirements. Expanding uses of prior art systems have created many challenges as the use of computer networks have increased. This has sometimes resulted in customized assemblies or modifications for expansion and has led to the need for arrangements comprising separate clusters of terminals at remote locations from the central computer.

Mainframe computers often incorporate communication networks composed of cluster controllers to which groups of terminals are connected. Data is transferred from the controller to the control site or central processing unit by means of appropriate buses and transmission lines. Because of the development of mini- and microcomputers as on-line rather than batch processing systems, the cluster controllers and special communications protocols of the mainframe computers were not readily adaptable to the smaller, and frequently special purpose, computers.

Initially, a smaller central processing unit (CPU) having a number of terminals at remote locations would simply be interconnected by means of individual lines or possibly, over longer distances, by leased telephone lines. Data concentrators, which may be referred to as statistical multiplexers, started being employed to reduce the line cost involved in communicating over a network of many lines between a computer interface and the remote user devices which were grouped in different locations. A statistical multiplexer accommodates many lines from the CPU interface and then provides transmission of data over a single high-speed composite line, where the data is then restored to a multiple line arrangement at the other end for connection to the user devices. The high-speed composite line is intended for communications in both directions and when employing the statistical multiplexer, requires relatively complex and expensive signal handling equipment at each end to provide the necessary conversions between multiple and single line format. Under some circumstances, if the number of lines were not relatively large, it is possible that the cost of the statistical multiplexer system would not provide a cost saving over the use of multiple lines.

Multi-terminal systems have grown substantially and a number of options have become available for enhancing these systems. These options include the statistical multiplexers mentioned above, intelligent switching systems and local area networks. However, the basic CPU data communications multiplexer has changed relatively little other than reduction of physical size and cost. There has not previously been available in mini- and microcomputer systems an efficient, cost effective computer/digital data communication system capable of supporting a large number of user terminals and devices and which allows user terminal port connections to be located at significant distances from the CPU or host computer, which system is expandable in the number of user terminals and devices which can be connected to it.

As computer uses have increased, even relatively small businesses and organizations employ a network of computers, input/output devices and user terminals. Typically, these small systems are interconnected by relatively short lengths of cable and adequate signal transmission is possible between devices located within a few hundred feet from the CPU. As the systems have continued to grow, restructuring of these systems has become necessary. Merely adding input/output ports, memory sizes, the number of user terminals and other elements to a computer system to satisfy greater and more varied requirements does not accomplish the intended purpose. It has been found that when a computer system expands beyond a certain complexity, quite different sets of requirements are placed on the system, creating many network interconnection challenges for the system designer. As the CPU and its associated user terminals and other devices are required to be located at greater distances, typically beyond 300 feet, standard cable interconnect systems are insufficient, due in part to noise pickup, grounding loops, signal degradation and the amount of physical cabling that is required.

When the requirement for line numbers grows to a certain point, typically beyond about 32, or the distances for connections between devices extends up to about 1,000 feet, problems begin to present themselves which require integrated and previously unavailable solutions. While modems and statistical multiplexers have been useful in reducing the number of lines for long distance communications, or to provide data transformations to enhance longer distance data transmissions, when computer systems become more complex, these devices become more and more a part of a customized system which is not adaptable for general use. As these systems become more complex, modems and statistical multiplexers merely attempt to solve the immediate problems but eventually do not result in simplifying the systems or improving communications.

It has been previously true that local area networks, which are able to be interconnected and placed at remote locations while being controlled from a single source, introduce the concept of distributed architecture. However, the cost of such devices designed for general application has been relatively high and could be prohibitive to the users of mini- or microcomputer CPU's. The multi-user interactive computer system is becoming increasingly popular as a data processing facility in smaller businesses and as a departmental computer in larger enterprises. Smaller members of this class machine have capacity to serve, for example, eight simultaneous users. Larger members of the class may serve over 200 simultaneous users. All interactive computer systems have some method for connecting user terminals and devices to them. It would be impractical to list every variation on the schemes that have been used by various vendors. However, the following sets forth a framework for reviewing them.

The term "electrical interface" refers to the voltage levels present on the wires, the pin-outs of the connectors and the meanings of the various control signals. It is possible that a computer vendor could use any arbitrary scheme, as long as the computer and the terminals both complied with it, thereby allowing everything within the system to function. This could have the initial apparent advantage to the vendor that third party terminal suppliers would be prevented from providing terminals to the system until the interface is reverse engineered.

Several widely accepted industry standards exist. By far the most common is referred to as RS-232C, and substantially all terminal vendors supply equipment which meets this standard. There are other standards which are gaining ground, such as RS-422, but these have not yet been widely adopted.

The term "serial interface," as it is commonly used, refers to a scheme of serializing parallel data for transmission over a single wire. Two main schemes in use are synchronous and asynchronous. Synchronous communications make more efficient use of the wire in that more useful data per unit time can be transmitted, but it requires costlier equipment at each end. Synchronous communications systems are typically found around large mainframe computers and in some of the small-business computer systems. Terminals intended for use on synchronous lines are typically more expensive than asynchronous terminals.

Other terms used are "multidrop," "dedicated" and "mixed." These refer to the various ways that a terminal can be connected to a single cable connected to the computer. In multidrop systems, more than one terminal can be connected to a single cable. This requires a scheme to be employed which keeps the data streams separated. Most prior art in the multidrop class functions as a polled system. A master station, typically the CPU, repeatedly polls each terminal, asking whether it has any data to send or if it is ready to accept data from the computer. This requires some intelligence in the terminal to respond to the polling sequence. Terminals must remain quiet until the master station polls them. This is used commonly on mainframe computers and in some other small-business systems. Polled multidrop systems are very frequently found with synchronous protocols, but some polled asynchronous systems have been designed. There have been no universal standards for what a polling sequence is, so mixed vendor systems are difficult to build with this approach.

Dedicated systems use a single cable between each terminal and the CPU. There is no polling so terminals can be unintelligent and hence have a relatively low cost. This is very commonly used on mini- and microcomputers. Dedicated systems are essential for "open system" or industry-standard machines that allow users to mix and match equipment from multiple vendors.

Mixed systems interpose some intelligent device between the computer and the terminals to convert between one scheme and the other. Some mixed systems have been marketed using "terminal servers" multi-dropped on a local area network. Typically such systems have used "contention" local area networks (LAN) and have not employed token-passing LAN technology. These contention LAN's are referred to as carrier sense, multiple access/collision detection (CSMA/CD) and carrier sense, multiple access/collision avoidance (CSMA/CA) and do not use token-passing LAN technology.

With reference to the term "connection hardware," we are concerned with how the signals from the terminals get into the computer. The basic prior art is the serial interface, a circuit that translates data to and from the serial form used by terminals and communication cables to the internal form used by the computer. On mainframe type machines, the serial interfaces are normally part of a box called a front end processor (FEP) which is external to the computer. The function of the FEP is to aggregate data from potentially hundreds of terminals and pass it to the computer over a very high speed interface in large "chunks." This is done so that the expensive computer does not spend much tie dealing with the mundane issues associated with managing communication line overhead functions, such as polling and transmission error recovery.

On mini- and microcomputers, multiple serial interfaces are typically packaged together on a single printed circuit card, which is then inserted into a card slot in the back of the computer. Card slots are limited, and are also used for interfaces to other things such as discs, printers and tapes, among others. Currently available systems package 8 or 16 serial interfaces per card. A recent trend is to package the functional equivalent of a "mini FEP" on the card with the serial interfaces. This gives the mini- or microcomputer the same kind of performance boost that a mainframe gets from an external FEP.

The vast majority of mini- and microcomputers use 8- or 16-line serial interface cards which service non-intelligent, asynchronous, RS-232C terminals over dedicated lines. There are several disadvantages to this approach. One is that it requires one cable per terminal. Adding a terminal means adding a cable from wherever the terminal will go to wherever the computer is. Cable itself is relatively inexpensive but installation adds significant cost.

Another disadvantage is that these lines are limited to a maximum length of about 300 feet unless specialized equipment is added to increase the cable length. This has the commensurate disadvantage of limiting the placement of user devices to within a reasonable proximity, that is, about 300 feet from the computer, without significant additional cost.

A further disadvantage is that it requires a card slot for every 8 or 16 lines. If the machine is being designed to ultimately accommodate as many as 128 user devices, enough slots, and the power supply and cooling capacity to run them, must be designed into the machine at the beginning. This power supply, cooling capacity and extra card slots also must be included in the entry-level price, even if the machine is initially sold with only eight terminals.

Still another significant disadvantage is that the serial interface card approach requires one relatively large connector to the back panel of the computer for each terminal cable. The industry-standard connector is normally referred to as DB-25. If as many as 128 of them are mounted on the back panel of the computer, it has two undesirable results. It restricts the designer's flexibility to make the overall package small, which is important from the competitive standpoint. Additionally, it means that there is a relatively ugly tangle of cables, often up to 128 or even more of them, behind the computer.

SUMMARY OF THE INVENTION

The present invention, among other positive aspects, overcomes all of the major disadvantages listed above. A single cable is installed around a building or between and in separate buildings, and cluster controllers are multidropped from it. The dedicated cable to the non-intelligent terminals runs from each terminal only to the nearest cluster controller. In many cases, adding to an existing system will require no new work by cable installers. A host adapter capable of supporting many cluster controllers fits in a single slot in the host computer card cage. This single board host adapter can support a large number of terminals, as many as 128 as presently configured. This means that the system designer need not design the system with costly power supply and cooling capacity to accommodate further expansion. It also means that the ultimate user need not pay for expansion capacity that the user may never need. Additionally, terminal capacity can be added without opening the computer cabinet itself which, in many cases, means that the computer vendor need not even send a service person to install it.

As to the connector size and complexity disadvantage mentioned above, by using the industry-standard large connectors, referred to as DB-25 connector, on each of the cluster controllers, the hardware at the back panel of the computer is limited to a single small "BNC" connector. This leaves the designer free to consider innovative packaging ideas to make computers physically smaller. Since the other components in the computer, including more powerful chips and denser disc drives among others, are getting smaller, this reduced size connector capability can be used to create a competitive advantage.

The system of this invention includes between 1 and 16 intelligent cluster controllers remotely located from and coupled to the host adapter by means of a coaxial cable. The cluster controllers are multidropped from the coaxial cable. The high speed communication line coupling cluster controllers to the host adapter functions as a 2.5 Mbit/second baseband, token-passing, serial bus, local area network. Each cluster controller provides local terminal connections for several terminal devices, 8 to 16 in the preferred embodiment.

The present invention preferably employs RS-232C terminals but it can function with RS-422 or any other standards accepted by the industry. The invention utilizes a line-efficient 2.5 Mbit/second serial baseband, token passing isochronous communication scheme between the computer and the remote cluster controllers and the low-cost asynchronous scheme between the cluster controllers and the user terminals and devices. From the cluster controllers to the terminals, the lines are dedicated. Since individual cables do not need to run from the computer to each terminal, this system saves considerable cable and installation cost, and allows the use of low cost terminals.

BRIEF DESCRIPTION OF THE DRAWING

The objects, advantages and features of this invention will be more clearly understood from the following detailed description when read in conjunction with the accompanying drawing, in which:

FIG. 2 is a block diagram of the host adapter board which is installed in a host computer system;

FIG. 3 is a block diagram of the main components of the token-pass transport interface used to implement the token-pass network which interconnects the host adapter and cluster controllers and includes an illustration of the T connector and a segment of the coaxial transmission line;

DESCRIPTION OF THE PREFERRED EMBODIMENT

Figure 1:
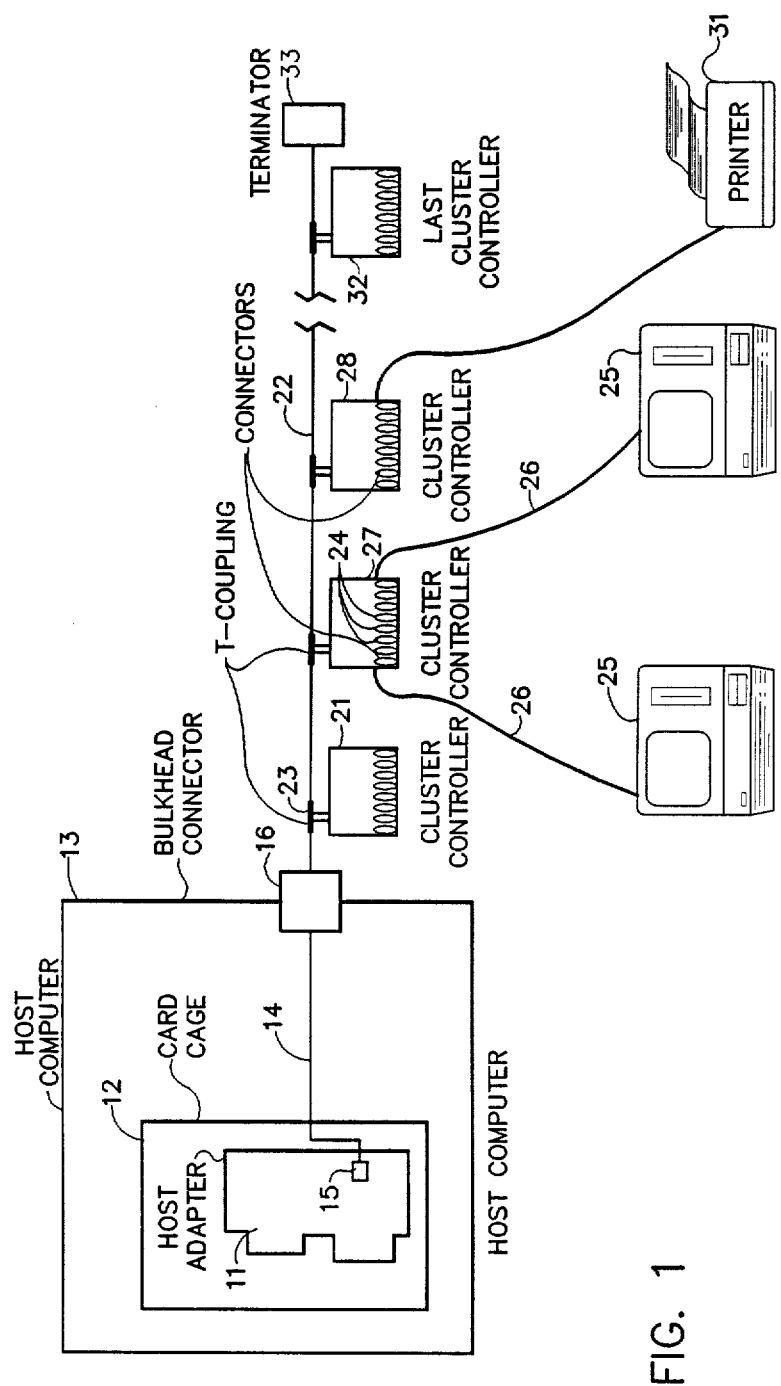
FIG. 1 is a functional block diagram of a typical system constructed according to the present invention, showing the host computer and the interconnection of a host adapter, cluster controllers and user devices.

With reference to the drawing, and more particularly to FIG. 1 thereof, there is shown a communication subsystem comprising a host adapter board 11 mounted in host computer card cage 12 in host computer 13. The host adapter board provides an electrical and software interface to the host computer. When the host computer needs to send data to one or more user terminals, the terminal driver software which is resident in the host computer places the data in bus accessible memory and then notifies the host adapter board that data is available. This function within the host computer is conventional and need not be further described here. The host adapter board then reads the data from the host memory and, after performing any necessary data transformations, sends the data out its coaxial cable 14 which connects from terminator 15 in host adapter board 11 to bulkhead connector 16 in the host computer, then on to main coaxial cable 22 and to the connected cluster controllers 21, 27, 28 and 32. These data transfers will be explained more fully later herein.

Data that is received from a remote source such as cluster controller 21 is handled in a very similar manner but in the reverse direction. Data from a cluster controller is sent over coaxial cable 22 to which it is connected by means of T-coupling 23 through bulkhead connector 16, over internal coaxial cable 14 to host adapter board 11. The data is held in memory on the host adapter board until the host computer is ready to receive it.

External coaxial cable 22 is extended as long as necessary from host computer 13 and several cluster controller units can be connected to it in a multidrop manner. The cluster controllers are intelligent devices that provide standard connections 24 to standard serial devices such as user terminals 25 by means of dedicated serial lines 26. Cluster controller 27 is shown connected to two of these devices while cluster controller 28 is connected to user device 31 shown as a printer. Although the user devices connected to the cluster controllers will normally be serial devices, the invention is not so limited.

The cluster controller is a self-contained device which is located remotely from the host computer system as shown. Data that is sent out from the host computer through the host adapter on coaxial cables 14 and 22 is addressed to a particular cluster controller. This data is capable of being received by any cluster controller but is only acted upon by the cluster controller with the appropriate address. That data is then sent out the appropriate RS-232C connector 24 to either a terminal or a printer or any other device which may be connected thereto. Additional cluster controllers can be added to the network of clusters by connecting another length of coaxial cable from one cluster to the next cluster. Alternatively, the coaxial cable 22 may be installed to its maximum length, ready to receive a cluster controller wherever desired. The coaxial cable network is terminated at the last cluster controller 32 with a conventional terminator resistor 33.

The combination of a host adapter board which has been installed in a host computer system, and the remotely located cluster controllers, forms the basis for the distributed communications subsystem of this invention. This communication subsystem is different from many prior art systems in that no serial device connections are required at the host computer itself. There are a number of other differences as will be understood as this description progresses.

Because there are no such serial device connections to the host computer, the back panel space, host system card cage slots, power and cooling requirements that normally would have been required need not be present in a host computer system. This can result in a significant size and cost saving for the host computer system itself. The terminals and printers can be connected to remote cluster controllers at some distance from the host computer system. The fact that remotely connected serial devices need not have their cables extended directly back to the computer can result in considerable savings in installed cable costs.

The invention is further distinguishable from any prior art devices in that it makes use of a token-passing architecture to implement the connection between the host computer and the remotely located cluster controllers. The token-passing architecture of the network is used to advantage in guaranteeing the maximum access time to remotely connected terminals under worst case load condition. Thus it is effective under all load conditions and particularly so when use is heavy.

Host adapter board 11 shown in FIG. 2 comprises a host adapter interface 35 which can be customized to be compatible with virtually any standard computer backplane architecture. There are several such architectures presently available and it is reasonable to assume that there will be several others. The host adapter interface has the general characteristics of providing address and data flow to and from the host computer. This transfer of data is usually synchronized with various control lines and bidirectional interrupts. The host adapter is shown with central processing unit (CPU) 36 which is mounted on board 11 and performs a variety of tasks. While not so limited, the present design of the host adapter employs a 68010 microprocessor for the CPU. This microprocessor is used to move data to and from the host computer and on-board random access memory (RAM) 37. The microprocessor is also used to move data to and from the on-board RAM and to and from token-pass transport interface 41. In addition to these data moving tasks, the CPU executes programming means or software that controls the distribution of data going to and from the clusters, manages data flow, and also performs any data transformations that may be required. The programming aspects will be more fully explained later.

On-board RAM 37 is comprised of dynamic RAM memory (DRAM) which requires a DRAM controller 43 to control access to the memory circuits and to keep the memory properly refreshed. The host adapter board also contains read only memory (ROM) 44 which contains initialization code, self test diagnostics and the on-board operating system. Token-pass transport interface 41 interfaces between on-board CPU 36 and the coaxial network that connects to the remote cluster controllers. Specifically, token-pass transport interface 41 connects to coaxial cable 14 as shown in FIG. 1. Lines 45 in the host adapter are referred to as the host adapter address and data bus.

The primary elements of the token-pass transport interface architecture are shown in FIG. 3. This interface is included in the host adapter and in each cluster controller.

The token-pass network used in this system is a self-polling "modified" token-passing network in which all token passes, as well as messages, are acknowledged by the receiving node or cluster controller. In this system only the node with the token is allowed to send data over the network. The protocol is currently operating at 2.5 Mbit/second and is more efficient under heavy loading than CSMA/CD systems such as that widely known by the trademark Ethernet. At the coaxial interface level the network incorporates the usage of baseband high input impedance transceivers 53 which allow a simple and efficient multidrop bus topology.

The line protocol can be described as isochronous because each byte is preceded by a start interval and ends with a stop interval. Unlike asynchronous protocols there is a fixed amount of time separating each byte of data. For example, a data byte consists of 11 clock intervals of 400 nanoseconds each. Each data byte transmitted is preceded by 2 clock intervals of mark and one interval of space followed by the 8 data bit intervals.

More specifically, the local CPU or microprocessor on either the host adapter or a cluster controller "sees" the token-pass network as a series of memory addresses comprising up to four pages or packets of data which can exist in transport buffer RAM 47. The transport buffer control mechanism 51 is used to isolate dedicated RAM network data buffer 47 from the CPU bus. Token-pass controller 46 is a complete controller for the token-pass protocol in that it handles all token-pass operations. Data conditioner 52 transforms the signals that come out of controller 46 to the format required for driving high impedance transceiver module 53.

The high impedance module provides the drive necessary to broadcast the token-pass message onto coaxial network cable 22 through internal connection 54 and coaxial T-connector 23. Note that the connection between the host adapter and coaxial cable 22 physically looks somewhat different than that shown in FIG. 3 since a T-connector is not necessary. Internal coax 14 is used to gain access to the computer's back panel. The high impedance transceiver module presents a transformer coupled, high impedance load to the coaxial network so that a number of cluster controllers can be connected to the network without disturbing the characteristic impedance of the coaxial transmission line.

The token-pass network is a true bus topology as opposed to a ring topology because each node can talk directly to any other node. In a ring topology each node only talks to the node that is physically next to it in the ring. The bus topology offers a higher degree of reliability than a ring in that a disabled node will not affect the rest of the system. An operation called reconfiguration occurs whenever the network bus has been idle for a while or if any of the nodes has not received the token for a predetermined length of time. During reconfiguration each node stores within itself the node address of the next highest node which is active on the net. The token is passed around the network by each node in turn sending a 3 byte invitation-to-transmit message, which contains a command character and the destination address of the next active node. A node, upon receiving the invitation to transmit, can then transmit a message if it has one pending. If no message is pending, or after the message has been sent, the node will then send an invitation-to-transmit to the next active node (pass the token). This operation is continuously repeated allowing each node in turn the opportunity to directly transmit to any other node.

Of special significance to the success of the system is the fact that a cluster controller can be connected to or removed from the coaxial line even while the system is on and operating, without affecting the rest of the communication subsystem. Each cluster controller is connected to the coaxial network through the token-pass transport interface by coaxial T-fitting 23 which acts as a three-way connector between the cluster and the incoming and outgoing coaxial cable 22.

Figure 4:
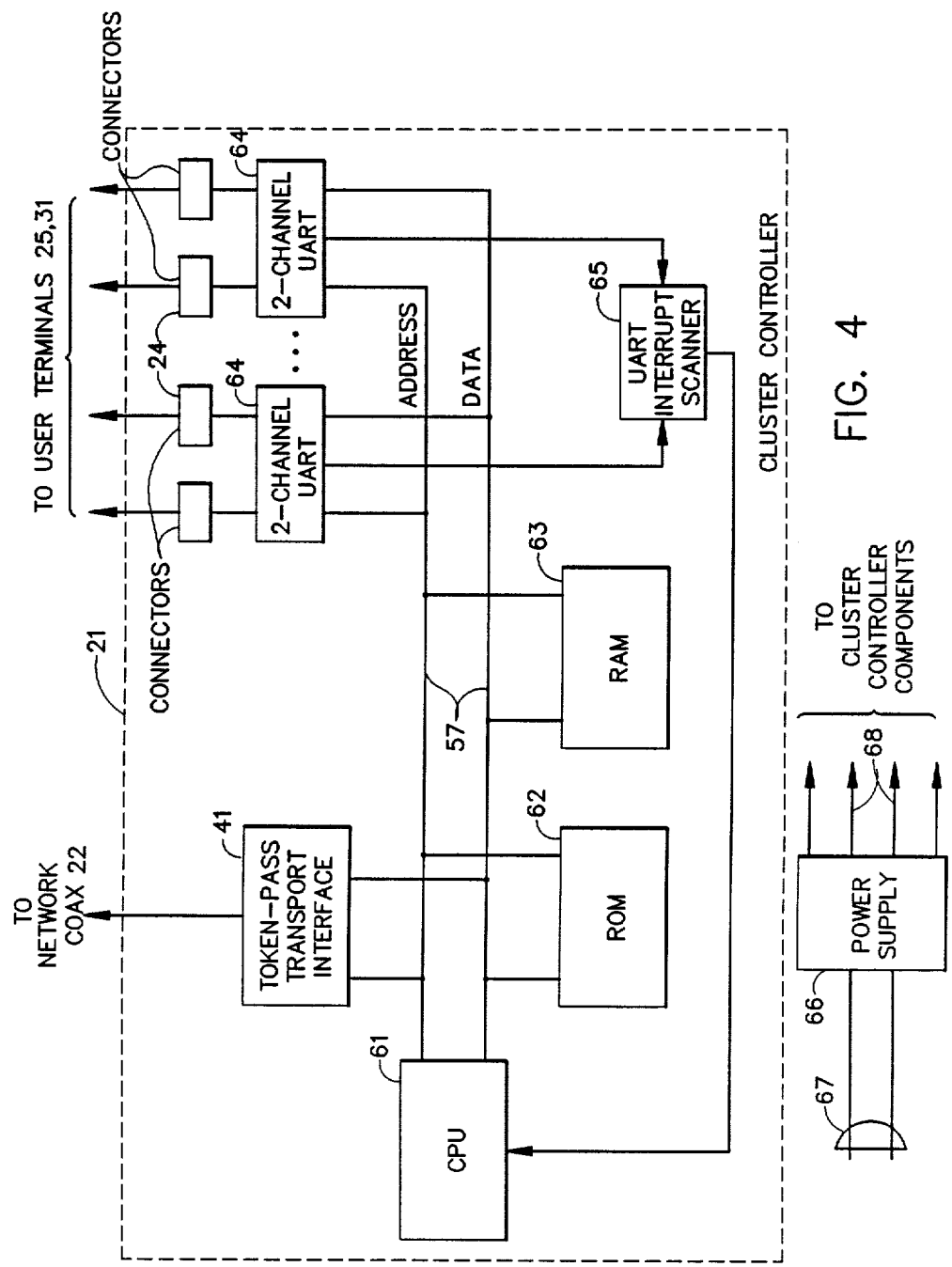
FIG. 4 is a block diagram of a cluster controller unit of the invention and a block diagram of the power supply, plug and related lines of the invention.

The cluster controller is shown in more complete detail in FIG. 4. CPU address and data bus 57 is centrally located and the other elements are connected thereto. Cluster controller 21 contains the data handling components and software between token-pass transport interface 41 and RS-232C serial channels 24. These serial channel devices provide the electrical signal level conversions as defined by the RS-232C serial protocol. CPU 61, typically a 68000 microprocessor, is responsible for executing software that manages the flow of data through the cluster controller. The program for CPU 61 is resident in ROM 62. This ROM contains the initialization, self test, operating system and data flow management software that controls the cluster controller operation. RAM 63 is used for local program variables and for buffering data to and from serial channels 24. The CPU sends and receives data from the serial channels by reading and writing the universal asynchronous receiver/transmitter (UART) two-channel modules 64. UART interrupt scanner mechanism 65 is included to improve performance. By using this scanner, particular user channels with data to transmit can be identified directly so CPU 61 does not need to poll to find out if the UART has data available or if its transmitter is ready. This provides a significant improvement in the amount of data that can be handled by the cluster controller.

All data received from a user device is stored in memory in the cluster controller until the proper time to forward it to the host adapter, where it is again stored until it is forwarded to the host computer. This store and forward process is important to the operating efficiency and accuracy of the communication subsystem of the invention.

Each cluster controller is a self-contained unit, each including power supply 66 that can be plugged into an ordinary wall outlet by means of plug 67. Lines 68 provide various voltages necessary for use by the cluster controller components.

The hardware described above provides the general environment for the executing software that actually connects the host computer to some number of remote user devices such as terminals and printers. The following is a description of the software that implements this function.

Figure 5:
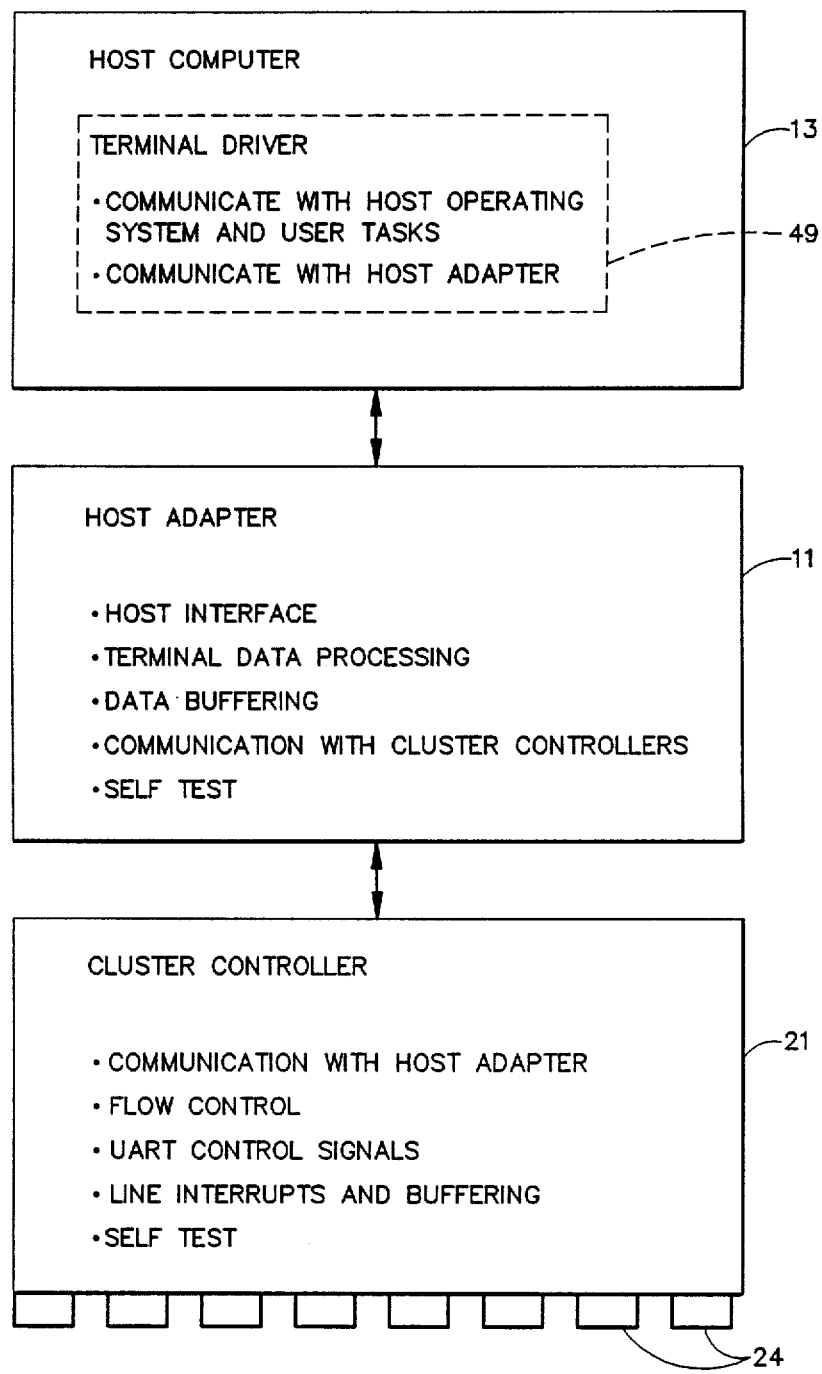
FIG. 5 is a high level overview of the distribution of responsibilities of the various pieces of software within the system of the invention.

A considerable amount of software is required to control the interaction of the host computer, the host adapter board and the cluster controllers, as well as to control the data flow through the entire communication subsystem. The software that makes up the preferred embodiment of this system is distributed among the host computer, the host adapter and the cluster controllers. FIG. 5 illustrates the high level distribution of the software responsibilities within the communication subsystem of this invention.

To operate with this system, host computer 13 must provide an interface between its software environment and the host adapter. This host software is generally referred to as host or terminal driver 49. This driver has two major divisions or functional purposes. The first is to interface with the host operating system and user processes. The host driver's main responsibility in this area is to translate information provided from the host system into information that is meaningful to the host adapter and to translate information from the host adapter into information that is meaningful to the host system. The information passed between the two is in the form of data and control information. This interface to the host operating system includes coordinating the requests from and the responses to a number of independent tasks on the host that are simultaneously accessing the host adapter.

The second major division of the host driver's purposes is to function as the host adapter interface. This main function of the host driver is to control the electrical interface to the host adapter. This involves passing information to and from the host adapter by means of dual-port RAM mechanism 42 (FIG. 2), handling interrupts generated by the host adapter, interrupting the host adapter when necessary, and setting up the host bus memory to enable direct memory access (DMA) transactions with the host adapter.

With additional reference to FIG. 2, data is passed from the host computer to the host adapter using a scheme of input/output control blocks (IOCB). A package of data is assembled in area 55 in memory 56 in host operating system 48. Then the IOCB is formed in area 58 in memory 56 and passed on to host adapter 11 over lines 40, 39 and 59. This information is processed in dual-port RAM 42, that is, the IOCB address is written in that memory portion. Then an interrupt signal is sent over line 60 to interrupt element 69. Host adapter 11 stops what it is doing and executes a "fetch IOCB" process from the host memory, then a "fetch data" process to get the data that has been packaged for delivery to the host adapter. That data is then stored in RAM 37 until forwarded out over coaxial cable 22 to the cluster controllers.

The host adapter 11 has several major responsibilities. The first is to function as the host interface. The host adapter is responsible for the entire coordination of the interface to the host computer through the interface of dual port RAM 42 and through the host bus DMA mechanism. The host-interface on the host adapter is responsible for accepting commands or requests from the host computer and routing them to the appropriate on-board task. It is also responsible for coordinating requests from on-board tasks to interrupt the host computer. It is further responsible for moving data and control information to and from host memory by means of the DMA mechanism.

Another function of the host adapter is terminal data processing. In an effort to reduce the amount of work the host computer must do to send and receive characters to and from asynchronous terminal ports, the host adapter performs as much of the character-by-character processing as possible. This includes, for input characters, special character recognition, error detection, character translation, line editing and character echoing, among others. This also includes for output characters, filtering non-printing characters, expanding tab characters, character translation, line printing overstrike processing, output delays, and other functions.

Another major responsibility of the host adapter is data buffering. The host adapter contains large buffers in RAM 37 that are dynamically allocated to temporarily store data as it is being transferred between the host and the cluster controllers. The store and forward communication process mentioned previously is evident here.

A most important function of the host adapter is communication with the cluster controllers. The host adapter has the responsibility of maintaining communication with all of the cluster controllers configured in the system. This includes keeping track of whether the cluster controllers are present or absent, gathering data to be sent to individual cluster controllers and monitoring buffer levels in the cluster, disbursing data received from individual cluster controllers, detecting and recovering from network and cluster errors, selecting operating parameters for the cluster software, and receiving and processing status change information from the clusters.

A final major function of the host adapter is self-test. Upon power-up or reset, the host adapter executes an extensive self-test to verify functionality of all of its components. This test includes a host interface test which requires interaction with the host computer. If the test fails, the unit will display an error indicator and disable further access to the board.

The major responsibilities of the cluster controller 21 will be discussed below. One important such responsibility of the cluster controller 21 is communication with the host adapter. This is the converse of the host adapter communication function. It is responsible for detecting and recovering from network errors, disbursing data received from the host adapter, gathering data to send to the host adapter, reporting changes of status and accepting operating parameters from the host adapter.

Another major responsibility of the cluster controllers is flow control. The cluster controllers are responsible for monitoring and controlling UART data flow. This is accomplished through the use of industry-standard flow control mechanisms. Two mechanisms are provided in hardware which are selected by the software, those being "request to send/clear to send" (RTS/CTS) and data set ready/data terminal ready (DSR/DTR). Two other mechanisms are completely software controlled, these being "end of transmission/acknowledgement" (ETX/ACK) and "start/stop" (XON/XOFF). The levels at which to disable and then re-enable data flow are selectable for both input and output.

A significant function of the cluster controller concerns UART control signals. The cluster controller has responsibility for setting and detecting the RS-232C control signals. These signals are required for correct operation of the RS-232C line and for proper handshaking between the two ends of the RS-232C line. Based on commands from the host adapter, the cluster controller sends these signals via the UART's and reports changes in these signals to the host adapter.

Another major responsibility of the cluster controller is to perform line interrupts and buffering. The cluster controller has the responsibility of responding to interrupts generated by the UART's. These interrupts are generated when: (a) an input character is available, (b) the UART is ready to accept another output character, or (c) some status change or error has occurred. In the first two cases, the cluster controller provides relatively small buffers to accept input data into and to send output data from.

Finally, a function of the cluster controller is self-test. Upon power-up or reset, the cluster controller executes an extensive self-test to verify the functionality of all of its components. If the test fails, the unit will display an error indicator and disable access to itself.

Figure 6:
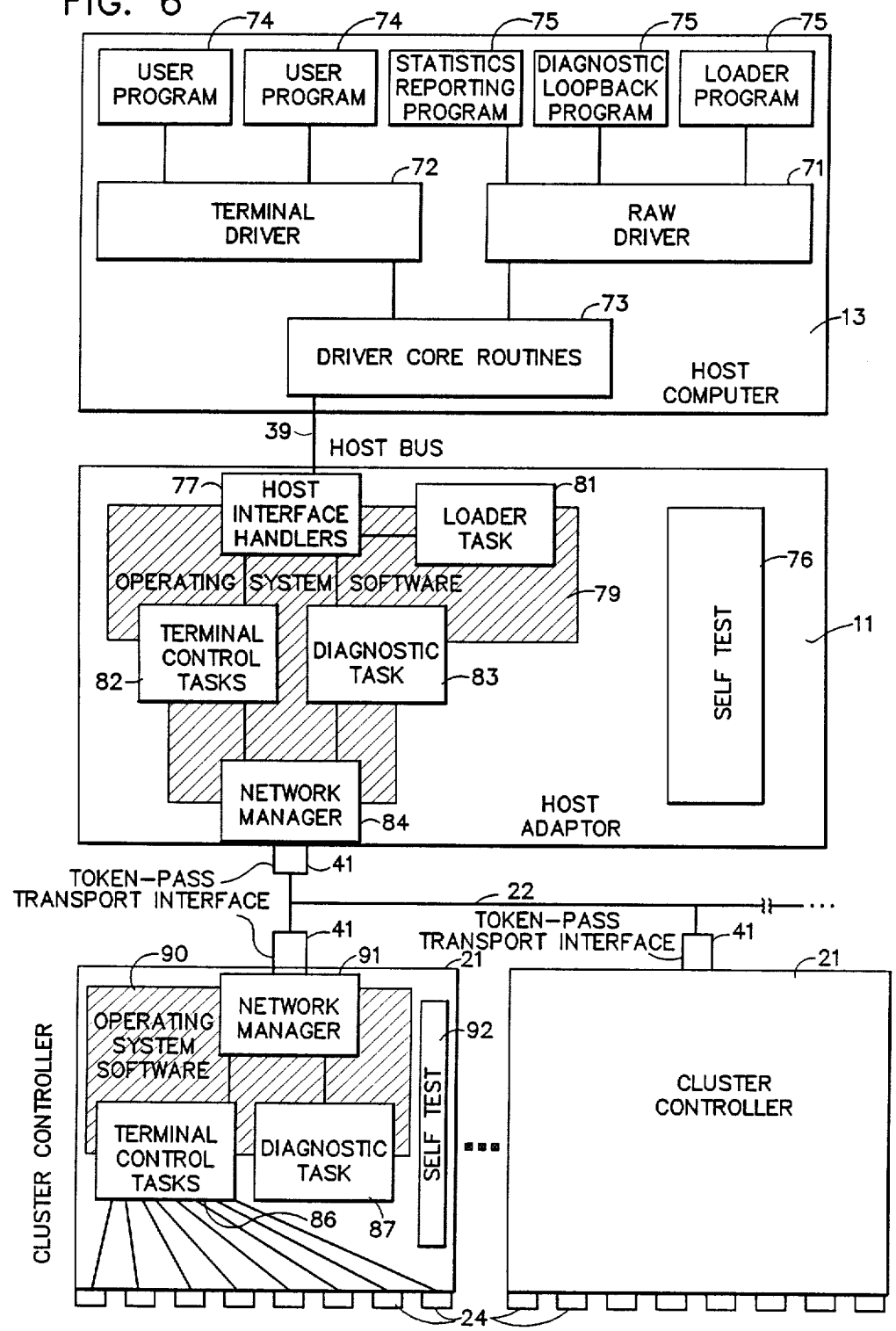
FIG. 6 is a block diagram of the organization of the software within the system of FIGS. 1 and 5.

We will now discuss software organization. The organization of the software of the communication subsystem of this invention is shown in more detail in FIG. 6. Because of the complexity and variability of the functions involved, the software on the host adapter and the cluster controllers is divided into a number of independently running tasks that interact with each other. The host software varies a great deal, based on the type of host operating system in use, but it is generally also organized as a number of independent tasks coordinated by a common driver. The functional block diagram of FIG. 6 shows the organization of the software to accomplish the major responsibilities described above.

The host system driver is organized into two major portions, the raw driver 71 and the terminal driver 72. Both of these drivers use a common set of driver core routines 73. The function of driver core routine is to coordinate requests from multiple drivers and control the actual interface to the host adapter over host bus 39. The raw driver and the terminal driver provide the interface to the host operating system and user tasks. As shown in this diagram, the user programs 74 and the other programs 75 are representative of the types of tasks that would be accessing the host adapter through the host drivers.

Raw driver 71 provides a generic interface to the host adapter. This generic interface does not know details about the function that is being accessed on the host adapter board, but only knows how to manipulate the interface to the board and the operating system. It is the responsibility of the user program to pass meaningful information to the raw driver.

Terminal driver 72 is a very specific driver that knows in detail the functions of the host adapter for handling terminal input/output. This driver translates requests from the host operating system and user tasks into specific requests to the host adapter. The terminal driver may be termed the actual interface between the host computer and the host adapter since it is imbedded in the host computer but is modified to work with the host adapter of the present invention subsystem. The two essential modifications to a typical terminal driver for use with the subsystem of the present invention are first, to convert all I/O operations to use the IOCB and dual-port RAM interface of the invention, and second, to select the desired operational parameters of the host adapter software.

Host adapter 11 has many complex, independent and interacting functions. To support this environment, the host adapter incorporates multi-tasking operating system 79 which provides the underlying support for all other activity on the adapter board once self-test is completed.

At the time of power-up or reset, the host adapter executes an extensive self-test through self-test software 76 in order to verify the functionality of all of its components. Self-test is resident in ROM 44 (FIG. 2) and must indicate that all systems are operable before any other operations can take place on the board. When the self-test is completed, it starts up operating system 79. The initialization for the operating system includes starting a number of ROM resident tasks, these being host interface handlers 77, which control the host computer interface 35 (FIG. 2), and the loader task 81. These tasks represent the minimum set of tasks to allow the host to communicate with the host adapter.

The host interface handlers provide two functions, one being to accept requests from the host computer over host bus 39 and route them to the appropriate on-board task. The other function is to coordinate requests to interrupt the host with information from a host adapter on-board task.

A loader task is a general purpose task that permits programs and data to be copied from the host to the host adapter and from the host adapter to the host and to initialize the adapter board. This allows additional programs and configuration information to be down-loaded to the adapter board. The loader task also keeps a log table of activity on the board and copies that to the host computer upon request.

Specific tasks that are down-loaded to the board from the host computer are terminal control tasks 82, the diagnostic task 83 and the network manager 84. The terminal control tasks are a set of tasks responsible for all the operations of the terminal handling capability of the host adapter. All the terminal data processing and data buffering previously mentioned are controlled by these tasks. In addition, they oversee the transfer of data and control commands to and from the host computer and the cluster controllers.

The diagnostic task is a task that is independent of the terminal control task and is used to check the functionality of the host adapter and the cluster controllers. It provides a loopback function that allows the host computer to send data to the host adapter and then read it back to verify it. Alternatively, the diagnostic task sends data through the host adapter to any selected cluster controller and receives it back.

As shown in FIG. 6, both of the above tasks use the network manager task to coordinate requests to and responses from the cluster controllers by means of high speed communication line local area network protocol interface, comprising the token-pass transport interfaces 1 and coaxial cable 22.

Although not as complex as the host adapter, each cluster controller also has a number of independent, interactive program tasks. To support these tasks, cluster controller 21 incorporates multi-tasking operating system 90 and all tasks running under it are allocated in ROM 62 (FIG. 4) and commence execution after the cluster controller self-test function 92 is completed. Each of the tasks on a cluster controller is essentially a counterpart of the corresponding task on the host adapter as described above.

Terminal control tasks 86 handle the responsibilities of controlling the data transcription between the host adapter and the cluster controller, monitoring and controlling data flow to and from the UART user terminals (flow control), setting and detecting the RS-232C UART control signals and responding to interrupts generated by the UART interrupt scanner 65.

Diagnostic task 87 provides a loopback function that allows the host adapter to send data to the cluster controller, then read it back to verify it.

All the cluster controller tasks use the network manager task 91 to coordinate requests to and responses from the host adapter by means of token-pass transport interface 41.

Figures 7, 8:
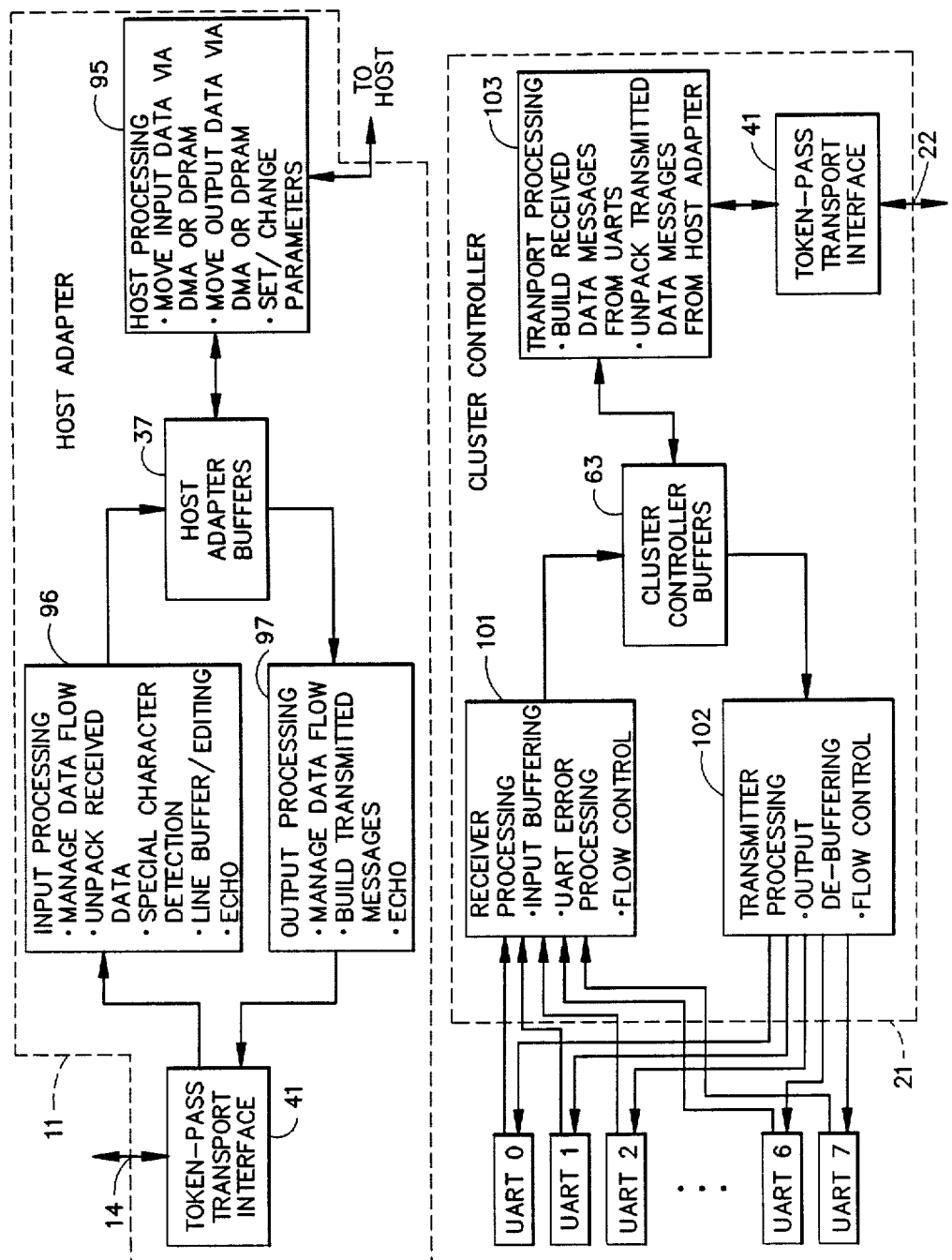
FIG. 7 is a data flow diagram showing the movement of terminal data through the host adapter of FIGS. 2 and 6.
FIG. 8 is a data flow diagram showing the movement of terminal data through the cluster controller as shown in FIGS. 4 and 6.

Because of the complexity of the tasks involved, the basic functionality of the system is best described by the way in which it handles the data. For this reason, FIGS. 7 and 8 are presented to show data flow diagrams describing the movement of the asynchronous terminal data through the communication subsystem of the invention. Again, the term "asynchronous" is used for descriptive purposes and is not limiting.

The host adapter data flow shown in FIG. 7 is divided into three major areas, those being host processing 95, input processing 96 and output processing 97. In host processing, the basic function is to move data between the host computer and the host adapter and to transmit control information between the two. This control information allows the host adapter to set, examine and modify operating parameters of the various terminal control tasks. Host processing also provides the host computer with status information about each serial channel that is in operation.

Both the input and the output processing include the function of managing the data flow. This involves keeping track of and informing both the host computer and the cluster controllers regarding the amount of buffer space available for more data. Input processing functions include unpacking received data, special character detection and recognition, error detection, character translation, line editing, character echoing and other functions associated with the handling of input data. The output processing function includes building transmitted messages, filtering non-printing characters, expanding tab characters, character translation, line printer overstrike processing, output delays and other related functions.

As shown in the host adapter data flow diagram of FIG. 7 (and in FIG. 8), both the cluster controller and the host adapter must build messages and deposit them in their respective transport buffer RAM 47 (FIG. 3) of the token-pass network for transmission over the network. These messages usually contain data for a number of channels packed together. The data for each channel is preceded by the appropriate identifier. Upon receipt of one of these messages, the data must be unpacked and distributed to the appropriate path for that channel.

The cluster controller data flow is shown in FIG. 8. The receiver processing function 101 on cluster controller 21 includes processing the input interrupts and buffering the data. In addition, the receiver processing function must monitor status changes and error conditions on the UART user terminals, and monitor flow control if it is enabled. With respect to input flow control, the receiver processing function can notify the transmitting line to stop sending data until the cluster controller is able to take more data.

The transmitter processing function 102 in the cluster controller includes processing the data interrupts and sending out data in buffers 63. In addition, the transmitter processing function must monitor flow control if it is enabled. On output flow control, the transmitter processing must be able to stop sending data upon command from the receiving line until the line tells it to resume sending data.

The transport processing function 103 operates as stated above, that is, to build messages for transmission over the network and, upon receipt of such messages, the data must be unpacked and distributed to the appropriate UART connected to the cluster controller.

It should now be apparent how the communication subsystem of this invention performs its function in an efficient and accurate manner. Specific components mentioned are for purposes of example only and the system is not limited to use of these devices. It can be stated that this system has adopted LAN technology, embedded it in a distributed multiplexing system, but it is not a LAN per se.

In view of the above description, it is likely that modifications and improvements will occur to those skilled in the art which are within the scope of this invention. Accordingly, the invention is limited only by the scope of the appended claims.

What is claimed is:

1. A decentralized input/output distributed communication subsystem for coupling user devices to a multi-user host computer having a host computer bus, said subsystem comprising:

a host adapter for interfacing with the operating system software of said host computer, and for translating messages between the communication protocol used in said host operating system an the communication protocol used to couple information to and from said user devices, said host adapter including a host adapter bus;

means in said host computer for directly coupling said host adapter to said host computer, comprising means for controlling an electrical interface between the host computer and the host adapter, and thereby allowing two-way communication between said host computer bus and said host adapter bus;

interface means on said host adapter for providing two-way communication between said host adapter bus and a single coaxial transmission line;

a plurality of cluster controllers remotely located from said host adapter, each of said cluster controllers providing an interface between said single coaxial transmission line and plural user devices; said single coaxial transmission line providing the sole communication link between said host adapter and said plurality of cluster controllers by providing substantially simultaneous transfer of data from said host adapter to each of said plural cluster controllers;

means for coupling each said cluster controller to said coaxial transmission line in multidrop manner, so that each cluster controller is coupled to said coaxial transmission line in a manner which permits a cluster controller to receive data from the transmission line without preventing succeeding cluster controllers, positioned further along said coaxial transmission line, from receiving the same data substantially simultaneously; and a plurality of terminal connector means on each said cluster controller, for connecting said cluster controllers to user devices, thereby permitting a single cluster controller to communicate with plural user devices.

2. The communication subsystem recited in claim 1, wherein said means for controlling said electrical interface comprises a terminal driver in said host computer.

3. The communication subsystem recited in claim 2, wherein said terminal driver comprises means for adapting all input/output operations in said host computer to use an addressing scheme and interface of said communication subsystem.

4. The communication subsystem recited in claim 2, wherein said terminal driver comprises means for selecting desired operational parameters of said hose adapter.

5. The communication subsystem of claim 4, wherein said terminal driver interfaces with the operating system in said host computer and with the user processes from said communication subsystem by translating information provided from said host computer into information that is meaningful to said host adapter, and by translating information from said host adapter into information that is meaningful to said host computer, all in the form of data and control information.

6. The communication subsystem of claim 5, wherein said electrical interface comprises:

means for passing information to and from memory means in said host adapter to handle interrupts generated by said host adapter;

means for interrupting said host adapter as necessary; and means for setting up bus memory in said host computer to enable direct memory access transactions with said host adapter.

7. The communication subsystem recited in claim 2, wherein said interface means on said host adapter comprises means for providing control and data flow to and from said host computer.

8. The communication subsystem recited in claim 7, wherein the data transferred to and from said host computer is synchronized with control lines and bidirectional interrupts in said host computer.

9. The communication subsystem recited in claim 1, wherein said host adapter further comprises:

central processing unit (CPU) means coupled to said host adapter interface means; and random access memory (RAM) means coupled to said host adapter interface means and to said CPU means so that data is transferred between said host computer and said RAM means by means of said CPU means.

10. The communication subsystem recited in claim 9, wherein said host adapter further comprises token-pass transport interface means for interfacing between said CPU means and said coaxial transmission line coupling to said cluster controllers.

11. The communication subsystem recited in claim 10, wherein said CPU means is coupled to said RAM means and said token-pass transport interface means to transfer data between said RAM means and said token-pass transport interface means.

12. The communication subsystem recited in claim 9, wherein:

said RAM means comprises a dynamic RAM (DRAM);

said host adapter further comprises a DRAM controller coupled to said RAM means so as to control access to said RAM and to keep said RAM properly refreshed.

13. The communication subsystem of claim 12, wherein said RAM means stores all data received from said cluster controllers and forwards said data to said host computer when requested by said host computer.

14. The communication subsystem recited in claim 1, wherein said host adapter comprises;

programming means; and central processing unit (CPU) means responsive to said programming means for controlling the distribution of data going to and from said cluster controllers.

15. The communication subsystem recited in claim 14, wherein said CPU means manages data flow.

16. The communication subsystem recited in claim 14, wherein said CPU means performs data transformations as required.

17. The communication subsystem recited in claim 1, wherein said host adapter and said cluster controllers each comprises a token-passing network coupled to said coaxial transmission line.

18. The communication subsystem recited in claim wherein said token-passing network is a self-polling, modified network, and wherein all messages are acknowledged by a receiving cluster controller.

19. The communication subsystem recited in claim 18, wherein said token-passing network comprises a protocol which operates at 2.5 Mbit/second.

20. The communication subsystem recited in claim 19, wherein said token-passing network comprises a baseband, high impedance transceiver, said protocol being isochronous, and wherein each byte is preceded by a start interval and ends with a stop interval.

21. The communication subsystem recited in claim 20, wherein said token-passing network further comprises token-pass controller means for handling all token-pass operations.

22. The communication subsystem recited in claim 21, wherein said token-passing network further comprises data conditioner means for transforming the data from said token-pass controller to a format required by said high impedance transceiver.

23. The communication subsystem recited in claim 22, wherein said token-passing network further comprises:

transport buffer RAM means including a series of memory addresses; and transport buffer control means coupled to said transport buffer RAM means so as to isolate said transport buffer RAM mans from other components in said host adapter and said cluster controller.

24. The communication subsystem recited in claim 17, wherein said token-passing network comprises a baseband, high impedance transceiver facilitating multi-drop topology in coupling with said coaxial transmission line.

25. The communication subsystem recited in claim 24, wherein said high impedance transceiver presents a transformer coupled, high impedance load to said coaxial transmission line, such that the characteristic impedance of said coaxial transmission line remains substantially the same when a plurality of said cluster controllers are connected to said coaxial transmission line.

26. The communication subsystem recited in claim 25, wherein said token-passing network, including said high impedance load, permits said cluster controllers to be connected to and disconnected from said coaxial transmission line while said communication subsystem is operating without adversely affecting operation of said communication subsystem.

27. The communication subsystem recited in claim 26, wherein said cluster controller coupling means comprises a coaxial T-fitting connecting said token-passing network in said cluster controller to said coaxial transmission line.

28. The communication subsystem recited in claim 1, wherein each said cluster controller comprises address and data bus means for coupling said cluster controller coupling means and said plurality of terminal connector means.

29. The communication subsystem recited in claim 28, wherein each said cluster controller further comprises data handling components and programming means connected to said cluster controller coupling means and said terminal connector means so as to control data flow between said cluster controller coupling means and said terminal connector means.

30. The communication subsystem recited in claim 31, wherein said cluster controller data handling components comprise central processing unit (CPU) means coupled to aid cluster controller coupling means for executing said programming means to manage data flow through said cluster controller.

31. The communication subsystem recited in claim 30, wherein said cluster controller data handling components comprise read only memory (ROM) means, said programming means being resident in said ROM, said ROM including initialization code, self-test diagnostics, operating system and data flow management programming for controlling operation of said cluster controller.

32. The communication subsystem of claim 31, wherein said cluster controller data handling components further comprise random access memory (RAM) means, coupled to said CPU means for storing local program variables and for buffering data to and from said terminal connector means.

33. The communication subsystem of claim 30, wherein said terminal connector means comprise universal asynchronous receiver/transmitter (UART) modules.

34. The communication subsystem of claim 30, wherein said cluster controller CPU sends and receives data from the user devices connected to said terminal connector means by reading and writing said terminal connector means.

35. The communication subsystem of claim 34, wherein said terminal interface means comprise universal asynchronous receiver/transmitter (UART) modules.

36. The communication subsystem of claim 34, wherein said cluster controller data handling components further comprise interrupt scanner means for identifying user devices having data to be directly read by said CPU means.

37. The communication subsystem of claim 36, wherein said cluster controller data handling components further comprise random access memory (RAM) means for storing all data received from the user devices, said CPU forwarding said data to said host adapter when allowed by said host adapter.

38. The communication subsystem of claim 37, wherein said host adapter comprises data storage means for storing all data received from said cluster controllers and forwarding such data to said host computer when requested by said host computer.

39. The communication subsystem of claim 1, wherein said host includes an electrical interface between said host computer and said host adapter, and wherein said host comprises:
   means for moving data and control information to and from memory in said host computer by means of direct memory access (DMA) mechanism;
   means for processing terminal data sent to and received from said user devices through said cluster controllers;
   means for buffering data in memory to thereby temporarily store data being transferred between said cluster controllers and said host computer;
   means for forwarding said stored data to said cluster controllers or said host computer at an appropriate time;
   means for communicating with said cluster controllers; and
   means for executing a self-test to verify the functionability of all host adapter components and of said interface with said host computer.

40. The communication subsystem of claim 39, wherein said host adapter, in communicating with said cluster controllers, comprises:
   means for monitoring the presence or absence of each said cluster controller;
   means for gathering data to be sent to each said cluster controller;
   means for monitoring buffer levels in each said cluster controller;
   means for disbursing data received from said cluster controllers;
   means for detecting and recovering from network and cluster controller errors;
   means for selecting operating parameters for programming means in each said cluster controller; and
   means for receiving and processing status change information from each said cluster controller.

41. The communication subsystem of claim 1, wherein each said cluster controller comprises:
   means for communicating with said host adapter so as to detect and recover from network errors;
   means for disbursing data received from said host adapter;
   means for gathering data to send to said host adapter;
   means for reporting status changes to said host adapter; and
   means for accepting operating parameters from said host adapter.

42. The communication subsystem of claim 41, wherein each said cluster controller further comprises:
   means for controlling data flow to and from the user devices;
   means for setting and detecting control signals to and from the user devices;
   means for performing line interrupts and buffering with respect to the user devices; and
   means for executing a self-test to verify the functionability of all cluster controller components.

43. The communication subsystem recited in claim 1, wherein said host adapter is a single board mounted in a single bus slot in said host computer.

44. The communication subsystem recited in claim 1, wherein said coaxial transmission line and said cluster controllers are connected to said host adapter through a single connector.

45. The communication subsystem recited in claim 1, wherein said interface means on said host adapter, a cluster controller, and said coaxial transmission line define a token-passing serial bus.

46. The communication subsystem recited in claim 1, wherein said host adapter further comprises read only memory (ROM) means electrically connected to said interface means, said ROM means utilizing:
   an initialization code stored in said ROM means;
   self-test diagnostics stored in said ROM means; and
   an on-board operating system stored in said ROM means for operating said host adapter.

47. The communication subsystem of claim 1 wherein each said cluster controller comprises individual power supply means separate from said host adapter and each other said cluster controller.

* * * * *

UNITED STATES PATENT AND TRADEMARK OFFICE
CERTIFICATE OF CORRECTION

PATENT NO. : 4,845,609

DATED : July 4, 1989

INVENTOR(S) : Eric L. Lighthart, Robert A. Hahn, Jean M. Lindstrom, and Jon R. Rummell It is certified that error appears in the above-identified patent and that said Letters Patent is hereby corrected as shown below:

Column 4, line 15, please correct "tie" to --time--.

Column 11, line 46, please delete "such".

Column 13, line 60, please correct "1" to --41--.

Column 15, line 38, please correct "an" to --and--.

Column 16, line 18, please correct "hose" to --host--.

Column 17, line 27, please correct "claim" to --claim 17--.

Column 17, line 55, please correct "mans" to --means--.

Column 18, line 27, please correct "claim 31" to --claim 29--.,

Column 18, line 29, please correct "aid" to --said--.

Column 18, line 61, please correct "terminal interface" to --terminal connector--.

Column 19, lines 10 - 12, please correct "wherein said host includes an electrical interface between said host computer and said host adapter, and wherein said host comprises:" --wherein said host adapter comprises:--.

UNITED STATES PATENT AND TRADEMARK OFFICE
CERTIFICATE OF CORRECTION

PATENT NO. : 4,845,609

DATED : July 4, 1989

INVENTOR(S) : Eric L. Lighthart, et al

It is certified that error appears in the above-identified patent and that said Letters Patent is hereby corrected as shown below:

Column 26, line 38, "utilizing" should be --including--.

Signed and Sealed this

Thirty-first Day of July, 1990

Attest:

HARRY F. MANBECK, JR.

*Attesting Officer*       *Commissioner of Patents and Trademarks*